United States Patent
Joo et al.

(10) Patent No.: US 7,154,870 B2
(45) Date of Patent: *Dec. 26, 2006

(54) METHOD OF HANDOFF CONTROL IN AN ENTERPRISE CODE DIVISION MULTIPLE ACCESS WIRELESS SYSTEM

(75) Inventors: Ki Hyun Joo, San Jose, CA (US);
Peter S. Rha, Santa Clara, CA (US);
Chol Su Kang, Fremont, CA (US);
Sang Kyoon Hyun, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/198,651

(22) Filed: Aug. 5, 2005

(65) Prior Publication Data

US 2006/0034229 A1    Feb. 16, 2006

Related U.S. Application Data

(63) Continuation of application No. 09/655,107, filed on Sep. 5, 2000.

(51) Int. Cl.
*H04Q 7/00* (2006.01)
(52) U.S. Cl. .................. 370/334; 370/335; 370/342; 455/440
(58) Field of Classification Search .................. None
See application file for complete search history.

(56) References Cited

U.S. PATENT DOCUMENTS

| | | | |
|---|---|---|---|
| 5,123,029 A | 6/1992 | Bantz et al. | 375/1 |
| 5,280,472 A | 1/1994 | Gilhousen et al. | 370/18 |
| 5,828,661 A | 10/1998 | Weaver, Jr. et al. | 370/331 |
| 5,848,063 A | 12/1998 | Weaver, Jr. et al. | 370/331 |
| 5,870,665 A | 2/1999 | Uchikawa | 455/11.1 |
| 5,903,834 A | 5/1999 | Wallstedt et al. | 455/422 |
| 5,917,811 A | 6/1999 | Weaver, Jr. et al. | 370/332 |
| 5,926,470 A | 7/1999 | Tiedemann, Jr. | 370/334 |
| 5,930,726 A | 7/1999 | Fujita | 455/555 |
| 5,956,641 A | 9/1999 | Bruckert et al. | 455/442 |
| 6,075,990 A | 6/2000 | Shin | 455/440 |
| 6,081,714 A | 6/2000 | Wakizaka | 455/437 |
| 6,198,935 B1 | 3/2001 | Saha et al. | 455/456.2 |
| 6,282,427 B1 | 8/2001 | Larsson et al. | 455/456.2 |
| 6,351,644 B1 | 2/2002 | Hussain et al. | 455/456.5 |
| 6,366,561 B1 | 4/2002 | Bender | 370/238 |

(Continued)

*Primary Examiner*—Bob A. Phunkulh
(74) *Attorney, Agent, or Firm*—Baker Botts L.L.P.

(57) ABSTRACT

A wireless office communication system including a wireless internet base station (WIBS) encompassing a base station controller (BSC), a mobile switch controller (MSC), and an ethernet interface module for coupling the wireless internet base station (WIBS) to an existing internet protocol (IP) based network. A wireless office communication system can also be based on the conventional architecture comprising the base station transceiver subsystem BTS, BSC, and MSC. The WIBS or BTS is attached to a number of antennas via different and identifiable delay elements for the purpose of determining the serving antennas of mobile communication units. A location determination logic enables the system to handle handoffs between a WIBS or BTS and the external public communication system in an optimum manner. Handling handoff requests in this manner prevents unnecessary ping-ponging of hand off and can also increase the percentage of successful handoff by frequency monitoring of the quality of the mobile communication units located in the handoff transition area, particularly to the public communication system.

23 Claims, 5 Drawing Sheets

U.S. PATENT DOCUMENTS

| | | | |
|---|---|---|---|
| 6,377,563 B1 | 4/2002 | Jeon et al. | 370/335 |
| 6,377,805 B1 | 4/2002 | Anvekar et al. | 455/436 |
| 6,385,452 B1 | 5/2002 | Zadeh et al. | 455/1 |
| 6,496,493 B1 | 12/2002 | Chung | 370/18 |
| 6,501,955 B1 | 12/2002 | Durrant et al. | 455/331 |
| 6,603,976 B1 | 8/2003 | Amirijoo et al. | 342/331 |
| 6,654,362 B1 | 11/2003 | Palamara | 370/11.1 |
| 6,654,609 B1 | 11/2003 | Kim | 455/422 |

METHOD OF HANDOFF CONTROL IN AN ENTERPRISE CODE DIVISION MULTIPLE ACCESS WIRELESS SYSTEM

CROSS-REFERENCE TO RELATED APPLICATION

This application is a continuation of U.S. application Ser. No. 09/655,107, filed Sep. 5, 2000 and entitled "Method of Handoff Control in an Enterprise Code Division Multiple Access Wireless System."

This application is related to Joo et al., co-filed U.S. patent application Ser. No. 09/655,102, entitled "HANDOFF CONTROL IN A CODE DIVISION MULTIPLE ACCESS WIRELESS SYSTEM." To the extent not repeated herein, the contents of Joo et al. are incorporated by reference.

FIELD OF THE INVENTION

The present claimed invention relates generally to the field of wireless communication systems. More particularly the present claimed invention relates to a method of handoff control between code division multiple access communication systems within an indoor enterprise system and with the public system.

BACKGROUND ART

Communication systems that utilize coded communication signals are well known in the art. One such system is a code division multiple access (CDMA) cellular communication system such as set forth in the Telecommunications Industry Association/Electronic Industries Association International Standard (TIA/EIA IS-95), hereinafter referred to as IS-95. In accordance with the IS-95, the coded communication signals used in CDMA systems comprise CDMA signals that are transmitted in a common 1.25 MHz bandwidth to base stations of the system from mobile or wireless communication units, such as cell phones or portable wireless computers or wireless handheld devices, that are communicating in a specific coverage area of the base station. In conventional CDMA systems, a base station transceiver subsystem (BTS) communicates with a base station controller (BSC) which allows the communication unit to communicate with other communication units within the same coverage area. Each CDMA signal includes a pseudo-noise (PN) sequence associated with a particular base station and an identification number of a communicating communication unit.

Typically, the BSC is connected to a mobile switching controller (MSC) which allows a BTS to connect with other BTS outside its coverage area in order to allow a communicating communication unit communicate with other units outside its coverage area.

FIG. 1 illustrates a conventional CDMA communication system 100 including a first base station 110, a second base station 120, and one or more communication units 105, 106. The communication system 100 illustrated in FIG. 1 is an exemplary CDMA system which includes a direct sequence CDMA cellular communication system, such as that set forth in TIA/EIA IS-95.

In the system shown in FIG. 1, base stations 110 and 120 are connected to base station controller 130 and mobile switching controller 140 which is in turn are connected to public switched telephone network (PSTN) 150 using known techniques.

The system shown in FIG. 1 further connects to the public land mobile network (PLMN) and PSTN to allow mobile communication units to travel from one network (roaming) to another network while maintaining a subscriber profile information. A detailed illustration of the PLMN is shown in FIG. 1B. In the system shown in FIG. 1B, a conventional cellular (or PCS) wireless communication network is shown. In the network shown in FIG. 1B, a network subscriber's profile information is typically stored and maintained in a home location register (HLR) and a visitor location register (VLR).

Still referring to FIG. 1, when a communication unit initiates a call sequence to either one of base stations 110 and 120 within a coverage area, an end-to-end connection is established between the respective base station and base station controller 130 and MSC 140 using known CDMA call setup techniques. Base stations 110 and 120 typically communicate with BSC 130 and MSC 140 via communication links, such as a T1 connection. Base stations 110 and 120 typically have antennas to define the coverage area within which either base stations primary accommodate the communication units.

In the system shown in FIG. 1, when a communicating communication unit initiates a call sequence (uplink) to the nearest base station, the call is assigned to the target communication unit via BSC 130 and MSC 140 within a prescribed bandwidth (e.g. 1.25 MHz for IS-95).

Also, in the conventional CDMA system shown in FIG. 1, communication between a communicating communication unit and the base station requires a dedicated end-to-end connection between the base station, the BSC and the MSC. Such dedicated end-to-end connection can also be very expensive and time-consuming.

In the exemplary CDMA system shown in FIG. 1, each base station transmits a pilot signal having a common PN spreading code that is offset in code phase from the pilot signal of other base stations within the system. During system operation, the mobile communication unit is provided a list of code phase offsets corresponding to neighboring base stations surrounding the base station through which communication is established. The mobile unit is equipped with a searching function which allows the mobile unit to track the signal strength of the pilot signal from a group of base stations including the neighboring base stations.

Various methods exist for switching the mobile communication unit from one base station to another (typically known as "handoff"). One such method is termed a "soft" handoff, in which communication between the mobile unit and the end user is uninterrupted by the eventual handoff from an original base station to a subsequent base station. This method is considered a soft handoff in that communication with the subsequent base station is established before terminating communication with the original base station. When the mobile unit is communicating with two base stations, a single signal for the end user is created from the signals from each base station by a communication system controller.

Mobile unit assisted soft handoff operates based on the pilot signal strength of several sets of base stations as measured by the communication unit. An active set is the set of base stations through which active communication is established. A neighbor set is a set of base stations surrounding an active base station comprising base stations that have a high probability of having a pilot signal strength of sufficient level to establish communication.

When communications are initially established, the communication unit communicates through a first base station, and the unit monitors the pilot signal strength of the base station in the active set and the neighbor set. When a pilot signal of a base station in the neighbor set exceeds a predetermined threshold level, the base station is added to the candidate set and removed from the neighbor set at the communication unit.

The communication unit communicates a message identifying the new base station. The BSC decides whether to establish communication between a new base station and the communication unit. Should the BSC decide to do so, the BSC sends a message to the new base station with identifying information about the communication unit and a command to establish communications.

When the communication unit is communicating with multiple base stations, it continues to monitor the signal strength of base stations to determine which base station to connect to in the event of a signal strength degradation.

Each base station has a coverage area that has two handoff boundaries. A handoff boundary is defined as the physical location between two base stations where the link would perform the same regardless of whether the mobile unit were communicating with the first base station or the second base station. Each base station has a forward link handoff boundary and a reverse link handoff boundary.

The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit. Ideally these boundaries should be balanced, meaning that they have the same physical location, with respect to the base station. If they are not balanced, system capacity may be reduced as the power control process is disturbed or the handoff region unreasonably expands.

In any of these conventional systems, the soft handoff between base stations still require the active base station to maintain contact with the BSC as it hands off communication to a neighboring base station or a candidate base station. Upon handing over communication, the new base station (now active base station) resumes communication with the mobile unit via the BSC. The conventional system described in FIG. 1 or FIG. 2 does not allow each base station to communicate with the other during a handoff since all communication has to go through the BSC. This takes time and in a data traffic transmission can be costly.

With the introduction of enterprise in building wireless communication services, the problem of handoff is even more accentuated within the enterprise system. FIG. 3 is a prior art illustration of an enterprise communication system. In the system of FIG. 3, the enterprise system may comprise of multiple BTS subsystems which may be located at the lower floor of a multi-floor building or campus networks.

The enterprise system of FIG. 3 needs to co-exist with the wide-area public system in terms of frequency reuse, interference control and to provide seamless services via handoff. However, in the system of FIG. 3, a common problem occurs when a mobile user enters a location that is near a border between two cell sites within the enterprise system. In this situation the signal level of the mobile unit tends to fluctuate at both cell sites. This signal level fluctuation results in a ping-pong situation in which repeated requests are made to handle calls back and forth between the two cell sites. Furthermore, the ping-pong situation raises the possibility that the call will be discontinued if it is unnecessarily transferred to a cell in which all channels are in use and thus unavailable for accepting the handoff.

In the system illustrated in FIG. 3, a user located in a higher floor in a multi-floor building may experience unnecessary ping-pong handoffs as a result of the mobile unit trying to communicate with the BTS internal to the enterprise system and the external cell sites which may be transmitting stronger signals than the internal BTS serving the mobile unit. This is because the signal strength of the wide-area public system is stronger, especially at locations "Loc A" and "Loc B" than the signal strength from the BTS located on the ground floor of the building.

Such unnecessary ping-pong of handoffs increases the mobile unit incorrectly hearing handoff commands or failure in hearing commands. Furthermore, the ping-pong situation raises the possibility that a call will be discontinued. This can be very costly and time-consuming for a mobile user communicating with any other mobile user within the enterprise system. Unnecessary ping-ponging handoffs also make it costly for the enterprise system accounting to reconcile calls within the enterprise system and those made to external cell sites.

Therefore, it is desirable to have a robust method for handing-off CDMA calls including voice and data over a communication pathway within an enterprise wireless communication system. It is further desirable to have a CDMA call handling method that handles the transmission of calls, especially data calls, without the inherent costly call ping-pong effect of the prior art. A need further exists for an improved and less costly system which improves the efficiency and the transmission rate and time of calls between a mobile unit and a base station and between base stations and a base station controller and between adjacent base stations within an enterprise wireless communication system.

SUMMARY OF INVENTION

The present invention is directed to a system and a method for providing an enterprise in-building or campus-wide IP based code division multiple access (CDMA) wireless system. The present invention is capable of handling both voice and data transmission within the CDMA system without the inherent delays and signal quality degradation encountered during call handoffs by conventional CDMA systems. The present invention further provides a system which controls handoffs between an enterprise CDMA communication system and macro systems external to the enterprise system by keeping users on the enterprise premise to the enterprise system. This therefore provides a less costly and a timely way of handling handoffs between the enterprise system and external macro systems without unnecessary ping-ponging between the two systems.

In the enterprise CDMA system of the present invention, a handoff technique is implemented which permits a mobile unit within the enterprise system to initiate a handoff. The mobile unit is permitted to determine the best new cell site to which communications are to be transferred to and from an old cell site. The invention further permits a cell base station to identify the location of the mobile unit requesting a handoff in order to determine the most efficient way to handle the handoff requests.

The invention further includes an integrated wireless internet base station (WIBS) which is connected to the Internet and an existing networking infrastructure within an office building or campus. The WIBS utilizes known ethernet transmission protocols to transmit data over an ethernet back bone to various wireless communication devices within a building. The WIBS further includes a call processing module which is capable of determining whether a call originating from or received by the base station to and from a communication unit is either a voice call or a data call. The WIBS also integrates the BCS functions of the prior art to reduce call setups between a communication unit and the WIBS, and call handoffs between multiple WIBS.

The invention further includes location based handoff control logic for handling communication diversity signal handoffs between various communication units and base stations within the enterprise system. The location based handoff control logic determines a particular base station, within the enterprise system, serving a particular user and hands off the user based on the signal delays inserted in the communication path between the user and the base station.

In one embodiment of the present invention, the hand off control logic hands off a mobile user to macro cell sites external to the enterprise system from a predetermined designated location within the enterprise system in order to avoid signal degradation and the cost of reconciling when mobile units within the enterprise system are communicating with the external cell sites.

The designated transition locations within the enterprise system are covered by extended antenna units which are directly or remotely connected to base stations located within the enterprise system. In a multi-floor enterprise system configuration, the extended antenna units may be distributed on various floors of a multi-floor building in order to provide the requisite coverage for the mobile units within the enterprise system.

The invention further includes communication signal delay elements which are inserted into the signal paths between the mobile units and the base stations in order to ensure that the enterprise base stations can only handoff communications with mobile units to the external macro cell site within the designated transition areas.

The invention further includes handoff implementation logic which allows handoffs within the enterprise system only to mobile units in the designated handoff transition areas.

The present invention further provides an implementation advantage over the prior art by allowing inter-network communication between the wireless office communication system of the present invention and other mobile networks on the PLMN. The inter-networking communication of the present invention is implemented over an ANSI-41D using the ethernet transport protocol of UDP/IP or TCP/IP transport protocol via an ethernet interface to the ethernet back bone of the system. The use of the ethernet interface is less costly than the prior art and further allows easy and flexible connectivity to existing in-office, building or campus networks.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Figure 1A:
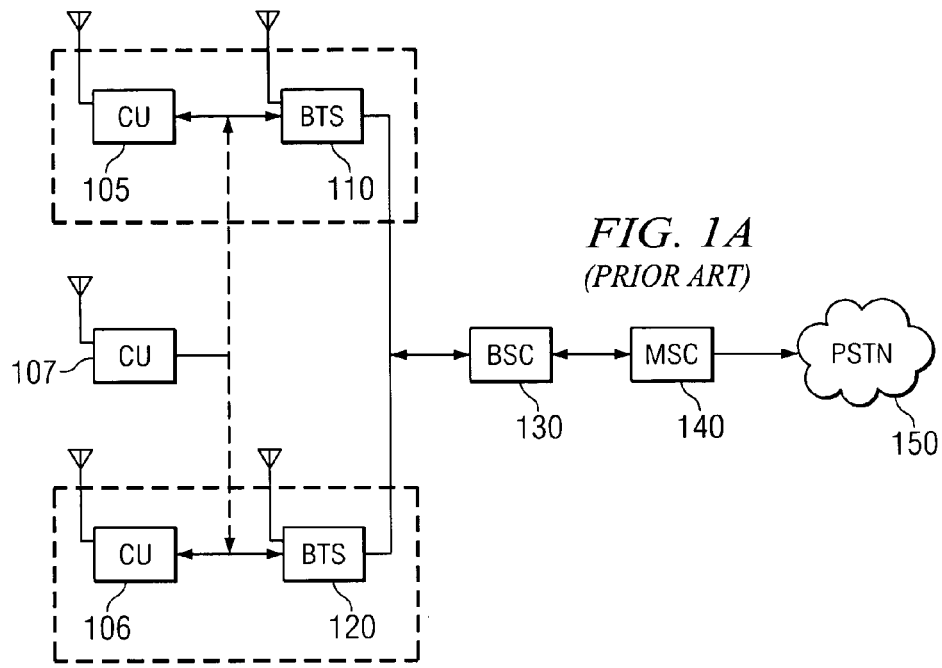
FIG. 1 is a block diagram of a conventional code division multiple access (CDMA) system.
FIG. 1B is a block diagram of an implementation of the public land mobile network (PLMN)
Figure 1B:
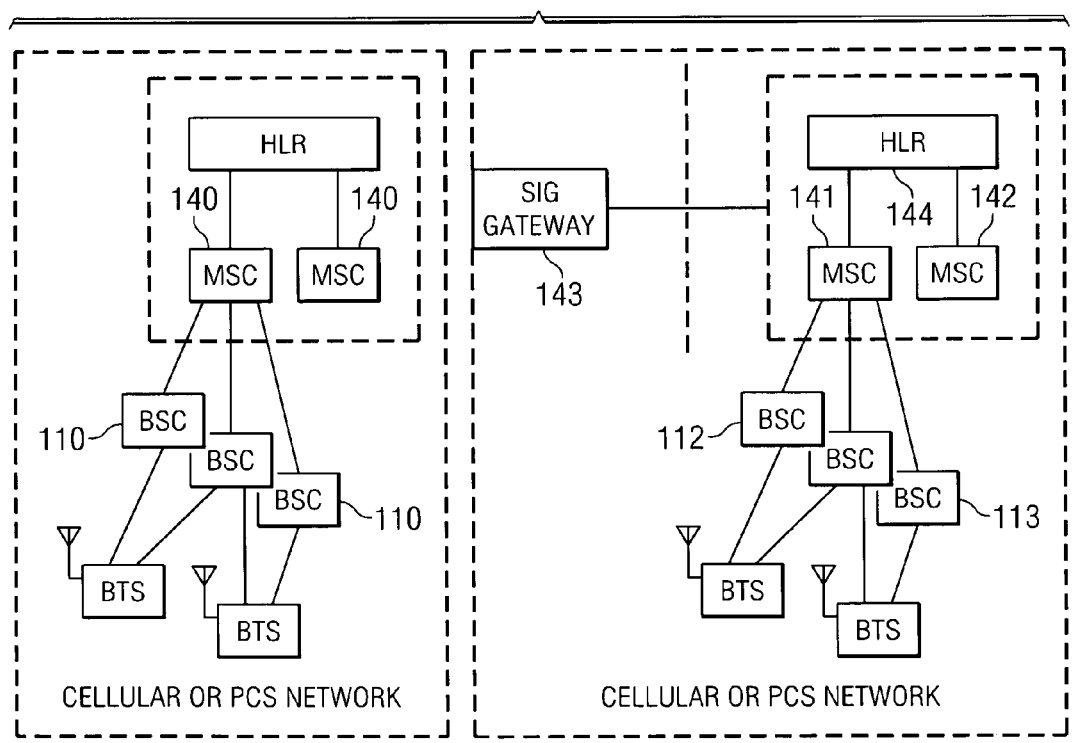
Figure 2:
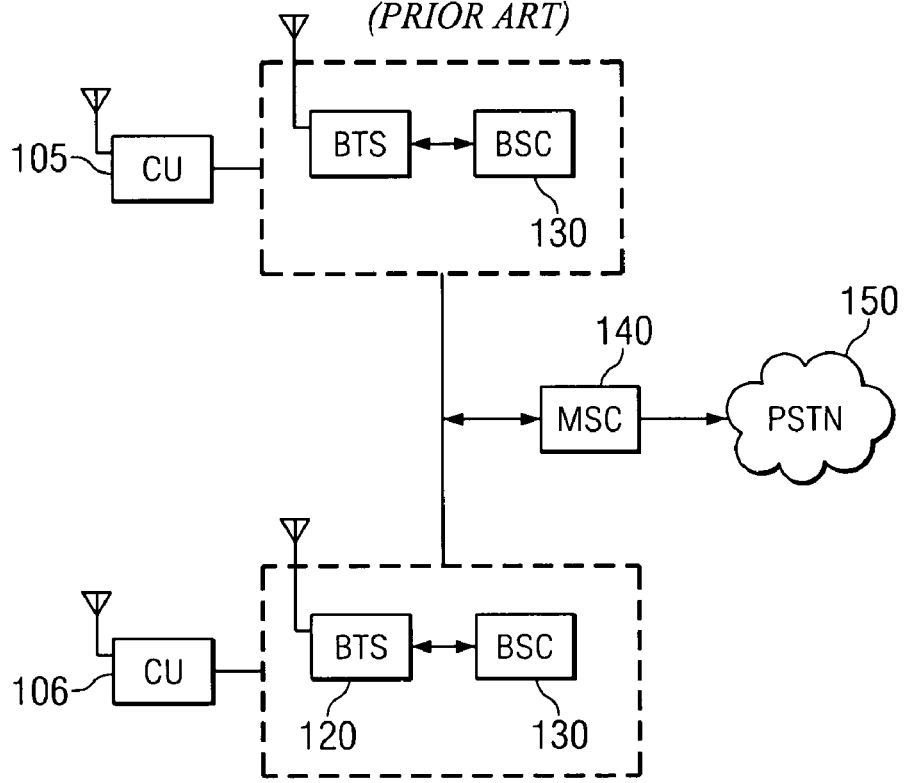
FIG. 2 is a block diagram of a conventional multiple carrier CDMA system.
Figure 3:
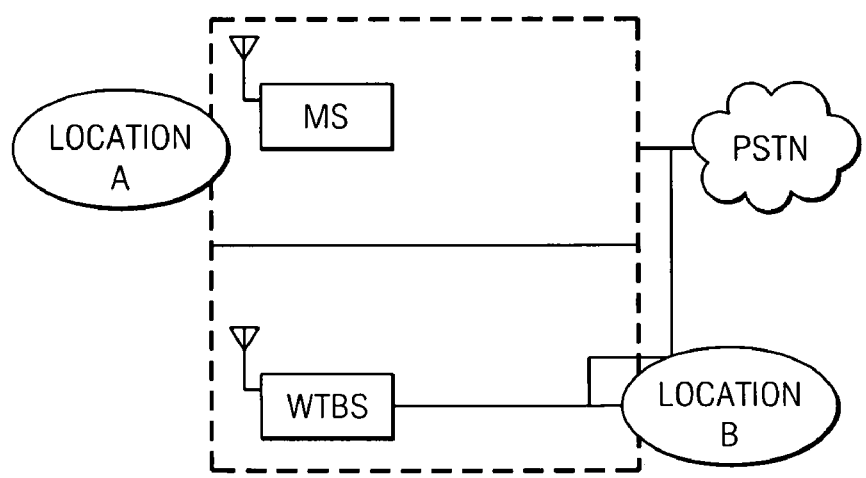
FIG. 3 is a block diagram of a prior art in-building enterprise communication system showing how signal handoffs are handled.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, an architecture, subsystem and method to manage mobile communication handoff requests in an enterprise wireless communication system in a way superior to the prior art.

In the following detailed description of the present invention, a system and method for a wireless internet protocol based communication system is described. Numerous specific details are not set forth in order to provide a thorough understanding of the present invention. However, it Will be recognized by one skilled in the art that the present invention may be practiced without these specific details or with equivalents thereof.

Generally, an aspect of the invention encompasses providing an integrated wireless enterprise system which may be an in-building or campus wide CDMA communication system which provides a wide range of voice, data, video and other services in conjunction with a private branch exchange interfaced to the public switched telephone network (PSTN) and the Internet. A wireless office communication system including a wireless internet base station (WIBS) encompassing a base station controller (BSC), a mobile switch controller (MSC) and an ethernet interface module for coupling the WIBS to an existing internet protocol (IP) based network. A wireless office communication system can also be based on the conventional architecture comprising the BTS, BSC and MSC. The WIBS or BTS is attached to a number of antennas via different and identifiable delay elements for the purpose of determining the serving antennas of mobile communication units. A location determination logic enables the system to handle handoffs between a WIBS or BTS and the external public communication system in an optimum manner. Handling handoff requests in this manner prevents unnecessary ping-ponging of handoff and can also increase the percentage of successful handoff by frequency monitoring of the quality of the mobile communication units located in the handoff transition area, particularly to the public communication system. The invention is generally adpatable to conventional CDMA communication systems and generally applies to frequency to frequency hard handoffs. The invention can be more fully described with reference to FIGS. 4 through 7.

FIGS. 4–7 illustrates systems and methods for determining user location within an enterprise wireless communication system in accordance to the preferred embodiments of the present invention. The location based handoff system and method illustrated in FIGS. 4–7 are each preferably implemented as part of a cellular telephone system that uses the CDMA techniques for communicating within a cellular telephone system.

Figure 4:
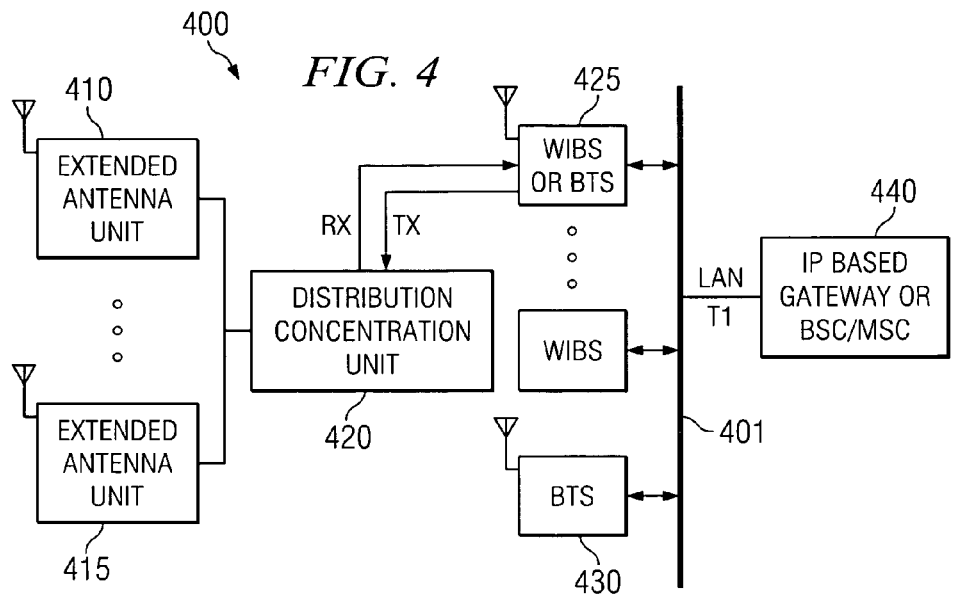
FIG. 4 is a block diagram of an embodiment of the in-building enterprise wireless communication system of the present invention including a distribution concentration unit, signal delay element unit, extended antenna units, and integrated wireless base stations of the present invention.

Referring now to FIG. 4, a functional illustration of the enterprise wireless communication system (EWCS) 400 of the present invention is shown. EWCS 400 comprises extended antenna units (EAUs) 410–415, signal distribution concentration unit (DCU) 420, wireless base stations (BTS) 425–430, communication pathway 401, IP based gateway 440 and base station controller 450.

EAUs 410–415 are preferably adapted to receive incoming communication signals from mobile communication units within EWCS 400. EAUs 410–415 can be passive or active with amplifying devices. EAUs 410–415 collect transmitted signals from mobile communication units within EWCS 400 and provides the signals to DCU 420. In one embodiment of the present invention, EAUs 410–415 include signal delay elements to resolve call multi-signals and to increase call diversity within the EWCS 400. The operation of the EAUs within the EWCS 400 depend on the deployment, transmission power and the in-door environment. For example, EAUs 410–415 may operationally cover an area of about 10–20 meters in an embodiment of EWCS 400.

DCU 420 is coupled to EAUs 410–415 to receive and transmit signals from the EAUs to base stations 425 and 430. In one embodiment of the present invention, DCU 420 includes signal delay element unit 421 to enable DCU 420 delay signal transmits to base stations 425 and 430.

Still referring to FIG. 4, BTS 425–430 are coupled to receive and transmit call signals from and to DCU 420. BTS 425–430 preferably is an IP based system which enables EWCS 400 to take advantage of existing networking infrastructure in an office building or a similar environment to communicate wireless calls from the mobile units to other wireless devices on the network, Internet, or to the PSTN. BTS 425–430 includes switching functions to process traffic from various sources such as voice and data for delivery over the ethernet back bone.

BTS 425–430 further provides interface between a CDMA PCS or a cellular mobile communication system and BTS 425–430 to enhance mobility within a wireless office environment covering hot spots or dead spots traditional public cellular or PCS networks such as on-campus, or the load could not address.

BTS 425–430 are coupled to the ethernet back bone 401 preferably through a 10/100 base-T interface and related software stack to handle data burst on the LAN that traditional CDMA system could not handle. BTS 425–430 receives and sends data to and from cellular regions within EWCS 400 to other subscribing mobile units in the EWCS 400.

The BTS 425–430 has forward and reverse link boundary similar to the prior art. The forward link is defined as the location where the mobile communication unit's receiver would perform the same regardless of which BTS it was receiving. The reverse link handoff boundary is defined as the location of the mobile communication unit where two BTS receivers would perform the same with respect to that mobile unit.

In the EWCS 400 of the present invention, a user location identification logic (not shown) is integrated into the base stations to identify mobile communications within the enterprise system. The identification logic further includes a handoff call request logic which allows the base station to optimize the control of mobile unit handoffs only within designated handoff transition regions within the enterprise system. Controlling handoff requests within the designated handoff region prevents unnecessary ping-ponging of handoffs between the mobile communication units and the external public system (e.g. PSTN).

Figure 5:
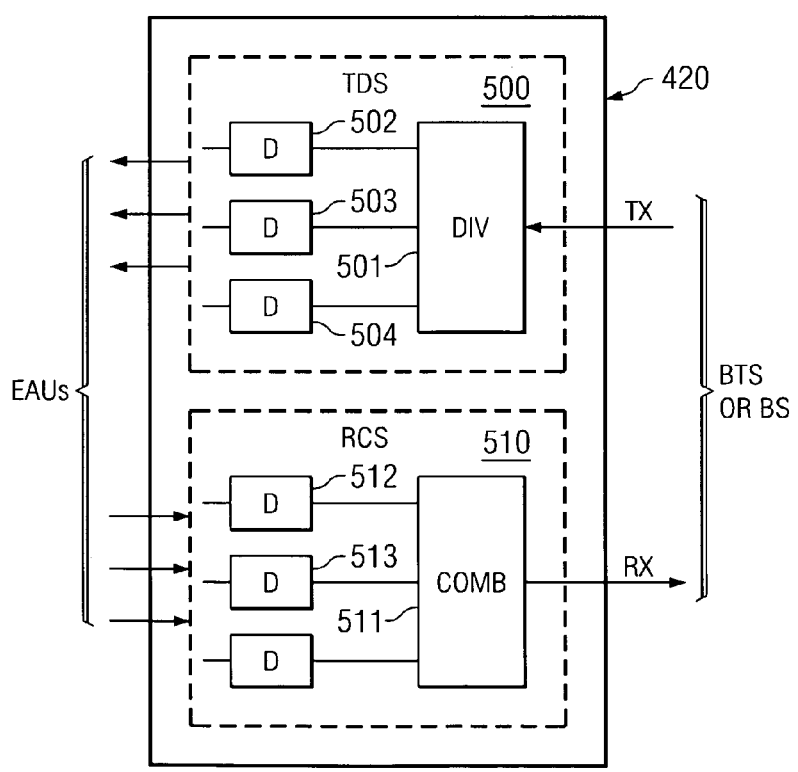
FIG. 5 is a block diagram of an embodiment of the distribution concentration unit including a transmit distribution subsystem and a receive concentration subsystem.

Referring now to FIG. 5, a functional block diagram illustrating one embodiment of the DCU 420 is shown. As shown in FIG. 5, DCU 420 preferably comprises transmit distribution subsystem (TDS) 500, receive concentration subsystem (RCS) 510 and other signal control logic (not shown).

DCU 420 is coupled to EAUs 410–415 to receive and transmit signals from the EAUs to base stations 425 and 430. In one embodiment of the present invention, DCU 420 includes signal delay element unit 421 to enable DCU 420 delay signal transmits to base stations 425 and 430. DCU 420 receives divided transmit signals from base stations 420–425, delays the divided transmit signal, and transmits the signals to the EAUs. DCU 420 further includes control logic capable of generating control messages such as cell diversity mode requests and cell site communication termination commands. The control processing logic is responsive to the data received from the EAUs and base stations in making decisions relative to handoffs and diversity combining. DCU 400 further receives multiple delayed transmit signals from the EAUs combines the signals and transmits the combined signals to base stations 425–430.

Still referring to FIG. 5, TDS 500 comprises a signal divider 501 coupled to a plurality of delay elements 502–504. In the present invention, TDS 500 receives a CDMA signal from base stations located within EWCS 400. The CDMA signal from the base stations are transmitted via multiple antennas distributed within the EWCS space for the purpose of each antenna covering part of an area to be covered by the base stations. The CDMA signal transmitted by the base stations are received by TDS 500, divided in divider 501 and distributed to the antenna via delay elements 502–504. Delay elements 502–504 have delay times large enough to be distinguishable by the base stations are inserted in the CDMA signal transmit paths to the antennas.

RCS 510 is coupled to receive CDMA signals transmitted by the various antennas within the EWCS 400 for transmission to the base stations. RCS 510 includes a combiner 511 and a plurality of delay elements 512–514. Like the delay elements in TDS 500, the delay elements in RCS 510 have time delays large enough to be distinguishable by the base stations. CDMA signals from mobile communication units within EWCS 400 are received via multiple antennas distributed within EWCS 400 and combined in combiner 511. The combined signal is connected to the base station receiver. The location determination logic in the base station determines the antenna unit serving a given mobile communication unit, and thus its location, by detection of the delay time of the received signal via signal RX.

Although the embodiment of the DCU shown in FIG. 5 shows delay elements inserted in the signal paths to the TDS and RCS, the delay elements do not necessarily have to be inserted in both the transmit and receive paths. For example, in one embodiment of the present invention, delay elements may be inserted in the transmit path and not in the receive. Alternatively, delay elements may be inserted into the receive path and not the transmit path.

The knowledge in the location of a mobile communication unit is used in optimizing the handoff performance between the EWCS 400 and the public systems, as well as within the enterprise system 400. For example, if the mobile communication unit is located in areas or on floors in a building where the user is not likely to transit to the coverage are of the public system, then any hand off requests to the public system are denied. If the mobile communication unit is located in the desired handoff area with the public system, then the handoff parameters and thresholds can be adjusted to improve the probability of successful handoff to the public system.

Figure 6A:
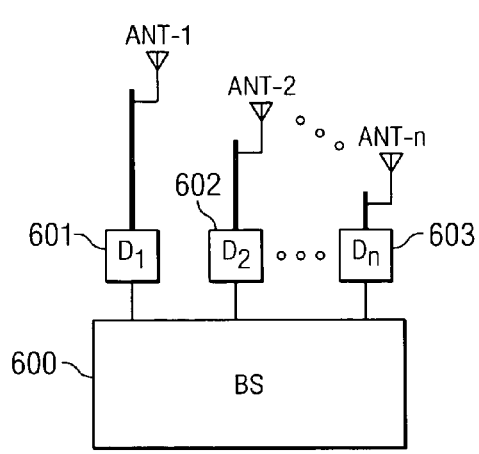
FIGS. 6A and 6B are block diagrams illustrating various configurations of the extended antenna units and the integrated wireless base stations of an embodiment the present invention.
Figure 6B:
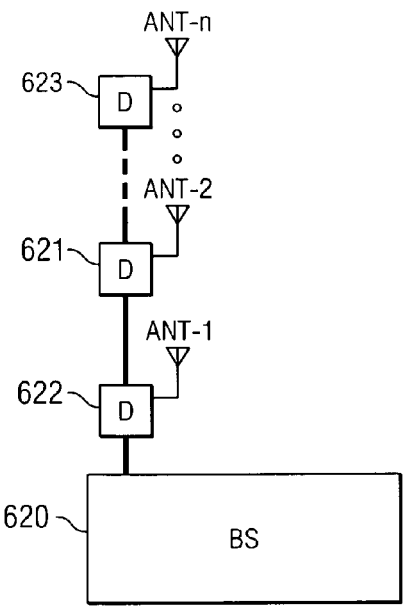

FIGS. 6A and 6B are block diagram illustrations of embodiments of how the location based handoff system of the present invention may be configured. In FIG. 6A, configuration 600 illustrates a star chain configuration of the antenna system within EWCS 400. In the star chain configuration, each antenna is separately coupled to the base station via separate signal paths with varying time delay elements inserted in each path. The star configuration of FIG. 6A offers a more reliable implementation of the enterprise system of the present invention since a break in the path of one antenna connection will not affect the other antennas in the system.

Another configuration of the system of the present invention is illustrated in configuration 620 (FIG. 6B). In configuration 620, the antennas in the enterprise system are daisy chained to the base station by coupling the antennas to a single communication path to the base station. Fixed time delay elements are inserted at various locations on the communication path to accomplish the objectives of the present invention. Although the daisy chain configuration may be a less costly than the star configuration, it is not as reliable because a break in any point in the communication path affects communications between the other antennas and the base station.

Figure 7A:
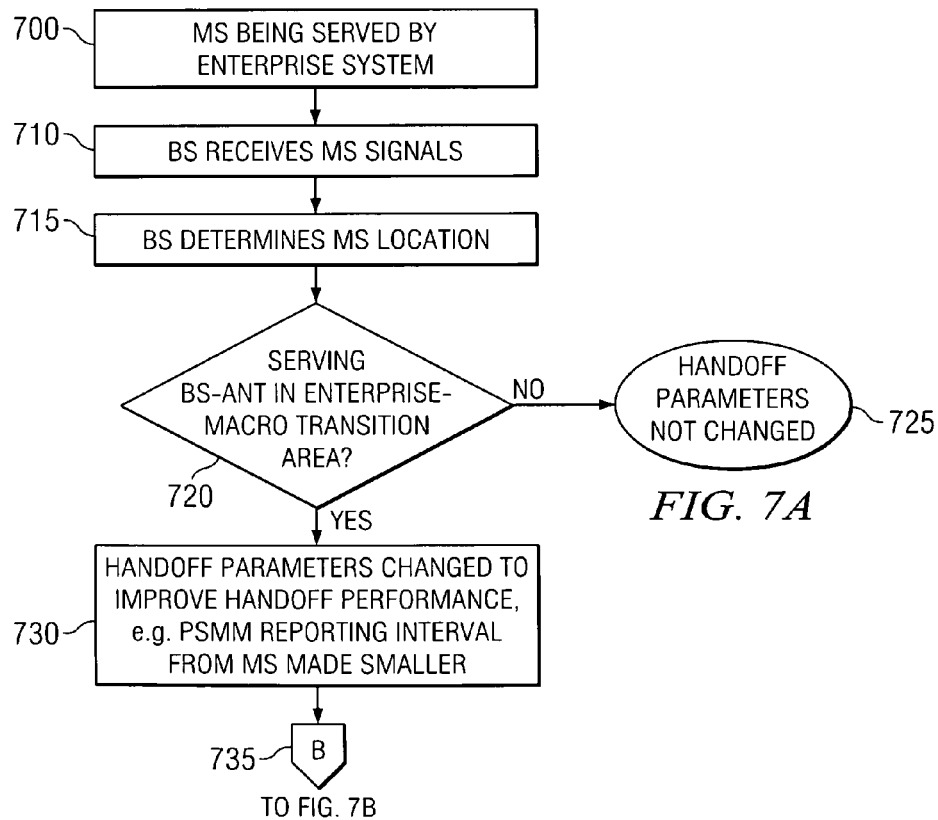
FIGS. 7A and 7B are flow diagrams illustrating an exemplary implementation of one embodiment of the user location determination logic of the present invention.

Referring to FIG. 7A is a flow diagram of the processing of calls initiated by a mobile unit to EWCS 400 is illustrated. As shown in FIG. 7A, a mobile call processing is initiated at step 700 when the EWCS receives a service request from the mobile units. At step 710, a base station receives a service request from the mobile unit, determines whether the transmitting mobile unit's profile information is stored in the EWCS, and determines the location of the mobile unit at step 715. At decision step 720, the base determines whether an antenna request being serviced from the EAUs is in the enterprise-macro system transition area. If the mobile unit is in the enterprise-macro system transition area, processing continues at step 730; otherwise the handoff parameters of the mobile unit are not changed and processing of the signal request from the mobile unit is discontinued at step 725. If, on the other hand, the mobile unit is within the enterprise-macro system transition region, the handoff parameters of the mobile unit are changed to improve handoff performance at step 730. Such handoff performance improvements may include making the pilot strength measurement message (PSMM) reporting interval from the mobile station smaller. Further processing of mobile unit handoff requests continues at step 735.

Figure 7B:
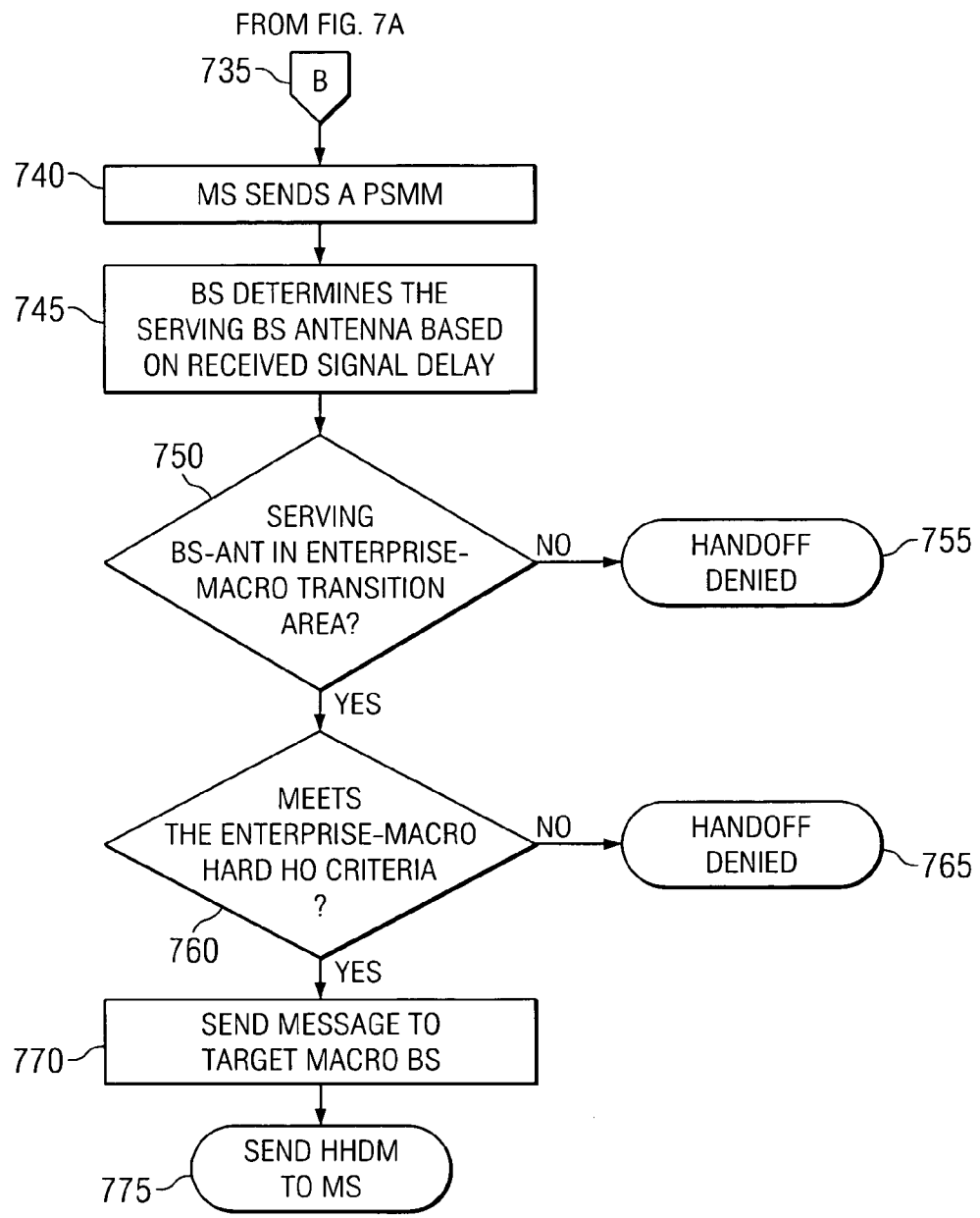

Referring to FIG. 7B, a flow diagram of one embodiment of the user location handoff determination logic of the present invention is shown. As illustrated in FIG. 7A, determining a user location within the EWCS 400 begins at step 700 and continues through step 735 when a mobile communication unit is being served by the enterprise system.

Continuing at step 740 the mobile communication unit transmits a PSMM to the serving base station within the enterprise system. The base station monitors the PSMM from each mobile unit via the corresponding antenna unit to determine if the signal being transmitted by the mobile unit falls within a predetermined threshold. If the strength of the pilot signal is above a certain threshold, the base station adds the signal to its active set of signals to service. Since the present invention only allows handoffs between a mobile unit and the external macro system within the handoff transition region, the base station handling inter-enterprise-macro system handoffs sets the handoff parameters for a frequent reporting of PSMM for a timely hand off to the macro system.

At step 745 the base station determines the antenna being served by decoding the received signal delay by utilizing the location based handoff logic of the present invention. In the preferred embodiment of the present invention, each antenna coupled to the serving base station has a time delay different from other antennas within the enterprise system.

At step 750 the base station determines whether the serving antenna is present in the enterprise-macro system transition area. If the serving antenna is present in the transition area, processing continues at step 760. If, on the other hand, the serving antenna is not present in the transition area, the handoff request is denied.

At step 760, if the serving antenna is within the handoff transition area, the base station determines whether the handoff request meets the enterprise-macro hard handoff criteria. If the antenna handoff request meets the enterprise-macro handoff criteria, processing continues at step 770 where the enterprise base station sends the requested message to the macro base station. If the antenna handoff request does not meet the enterprise-macro handoff request, the handoff request is denied and processing of the request is terminated at step 765.

At step 775, if the antenna handoff request meets the enterprise-macro handoff criteria, the enterprise base station sends an extended handoff direction message to the mobile communication unit and the handoff request processing is completed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications which are suited to the particular use contemplated. It is intended that the scope of the invention be defined by the claims appended hereto and their equivalents.

The invention claimed is:

1. A system for executing a handoff, comprising:
   means for sending a plurality of hand off request signals associated with a communication session to a base station within an enterprise system, wherein one of the plurality of handoff request signals emanating from a pre-designated handoff transition region within the enterprise system is identified, whereby time delaying of the handoff request signals to the base station is performed, and wherein the time delaying of the handoff request signals includes dividing the handoff request signals into multiple request signals responsive to antenna units within the enterprise system; and
   means for executing the communication session.

2. The system of claim 1, further comprising:
   means for combining the divided delayed signals into a single request signal to be sent to the base station.

3. The system of claim 1, wherein a transmit distribution subsystem is provided to interact with a base transceiver station and the means for sending the handoff request signal.

4. The system of claim 1, wherein the means for time delaying the handoff request signals includes means for inserting time delays only in handoff request signals sent by mobile units within the enterprise system.

5. The system of claim 1, wherein the means for time delaying the handoff request signals includes the step of inserting time delays only in the handoff request signals sent to base stations within the enterprise communication system.

6. The system of claim 1, wherein a handoff request is denied if it is not within the transition region.

7. The system of claim 1, wherein if a mobile communication device is within the transition region, then handoff parameters are changed in order to enhance a successful execution of a handoff.

8. A system for managing a handoff between a mobile communication unit within a code division multiple access (CDMA) communication system and an external public cellular system, comprising:
   means for receiving a plurality of handoff request signals, wherein a handoff region within the communication system is designated;
   means for identifying an originating location of the handoff request signals by making delay measurements of each of the plurality of handoff request signals;
   means for using location identification information to hand off each of the request signals; and
   means for time delaying the handoff request signals to a base station, wherein time delaying of the handoff request signals includes dividing the handoff request signals into multiple request signals responsive to multiple extended antenna units within the enterprise system.

9. The system of claim 8, further comprising:
   means for determining whether handoff request signals are emanating from the handoff region.

10. The system of claim 8, wherein if the handoff request signal emanates from the transition region, the mobile communication unit transmitting the handoff request signal is handed off to the external public cellular system.

11. The system of claim 8, wherein if the handoff request signal emanates from a location outside of the transition region, then the mobile communication unit transmitting the handoff request signal is handed off to a base station within the communication system.

12. An apparatus for optimizing handoff between an enterprise code division multiple access (CDMA) communication system and a cellular communication system, comprising:
    a mobile communication unit operable to send a plurality of hand off request signals to a base station within the enterprise system, wherein an identification is performed of which one of the plurality of handoff request signals emanates from a pre-designated handoff transition region within the enterprise system, whereby the identified handoff request signal is handed off to the cellular communication system, and wherein time delaying of the handoff request signals to the base station is executed, the handoff request signals being divided into multiple request signals responsive to antenna units within the enterprise system.

13. The apparatus of claim 12, wherein the divided delayed signals are combined into a single request signal to be communicated to the base station.

14. The apparatus of claim 12, wherein the mobile communication unit is coupled to a transmit distribution subsystem.

15. The apparatus of claim 14, wherein the transmit distribution subsystem includes a plurality of signal transmit delay elements coupled to a signal dividing unit.

16. The apparatus of claim 12, wherein time delays are only inserted in handoff request signals sent by mobile communication units in the enterprise system.

17. The apparatus of claim 12, wherein time delays are only inserted in the handoff request signals sent to base stations within the enterprise communication system.

18. The apparatus of claim 12, wherein the mobile communication unit is operable to send a handoff request signal comprising a pilot strength measurement message (PSMM) to a base station within the CDMA communication system.

19. The apparatus of claim 18, wherein locations of mobile communication units are determined by making delay measurements of each of the mobile communication units.

20. The apparatus of claim 18, wherein prior to a handoff being performed, a determination is made as to whether the handoff request signals meets an enterprise system criteria or a public cellular system handoff criteria.

21. The apparatus of claim 20, wherein if the handoff request signal meets the enterprise system and public cellular system handoff criteria, then the PSMM is sent to a target base station.

22. The apparatus of claim 12, wherein a handoff request is denied if it is not within the transition region.

23. The apparatus of claim 12, wherein if a mobile communication device is within the transition region, then handoff parameters are changed in order to enhance a successful execution of a handoff.

* * * * *